United States Patent [19]
Sheppard

[11] 4,325,288
[45] Apr. 20, 1982

[54] POWER STEERING GEAR WITH INITIAL LOCKABLE SPRING ADJUSTING NUTS

[76] Inventor: Peter H. Sheppard, R. H. Sheppard Co., Inc., Hanover, Pa. 17331

[21] Appl. No.: 115,045

[22] Filed: Jan. 24, 1980

[51] Int. Cl.³ .............................................. F15B 9/10
[52] U.S. Cl. ...................................... 91/422; 91/378; 411/304
[58] Field of Search ..................... 91/378, 422; 151/7; 411/304

[56] References Cited

U.S. PATENT DOCUMENTS

| | | |
|---|---|---|
| 2,481,762 | 9/1949 | Lewis . |
| 2,607,956 | 8/1952 | Brutus . |
| 3,092,083 | 6/1963 | Sheppard . |
| 3,992,490 | 11/1976 | Preston . |
| 4,088,063 | 5/1978 | Sheppard ............................. 91/378 |
| 4,217,813 | 8/1980 | Bradley ............................... 151/7 X |

FOREIGN PATENT DOCUMENTS 419647  8/1974  U.S.S.R. ................................. 151/7

*Primary Examiner*—Gerald A. Michalsky
*Attorney, Agent, or Firm*—Lowe, King, Price & Becker

[57] ABSTRACT

An integral power steering gear with a spool-like valve within the piston is provided with washer springs to center the valve and self locking adjusting nuts for the springs. Nylon locking balls are positioned in radial holes to perform the locking function and are equally spaced around the nut so that the nut is maintained in the centered position for accurate spring loading at all times. Each of the balls is frictionally held within the mounting hole so as to be retained prior to installation. The balls are positioned substantially flush with the top of the threads of the nut. As the nuts are installed, the mating threads in the piston deform each ball providing full frictional engagement with at least one thread, and by bulges with the sides of adjacent threads. Bulges of the deformed ball also serve to stabilize the ball in the holes.

11 Claims, 4 Drawing Figures

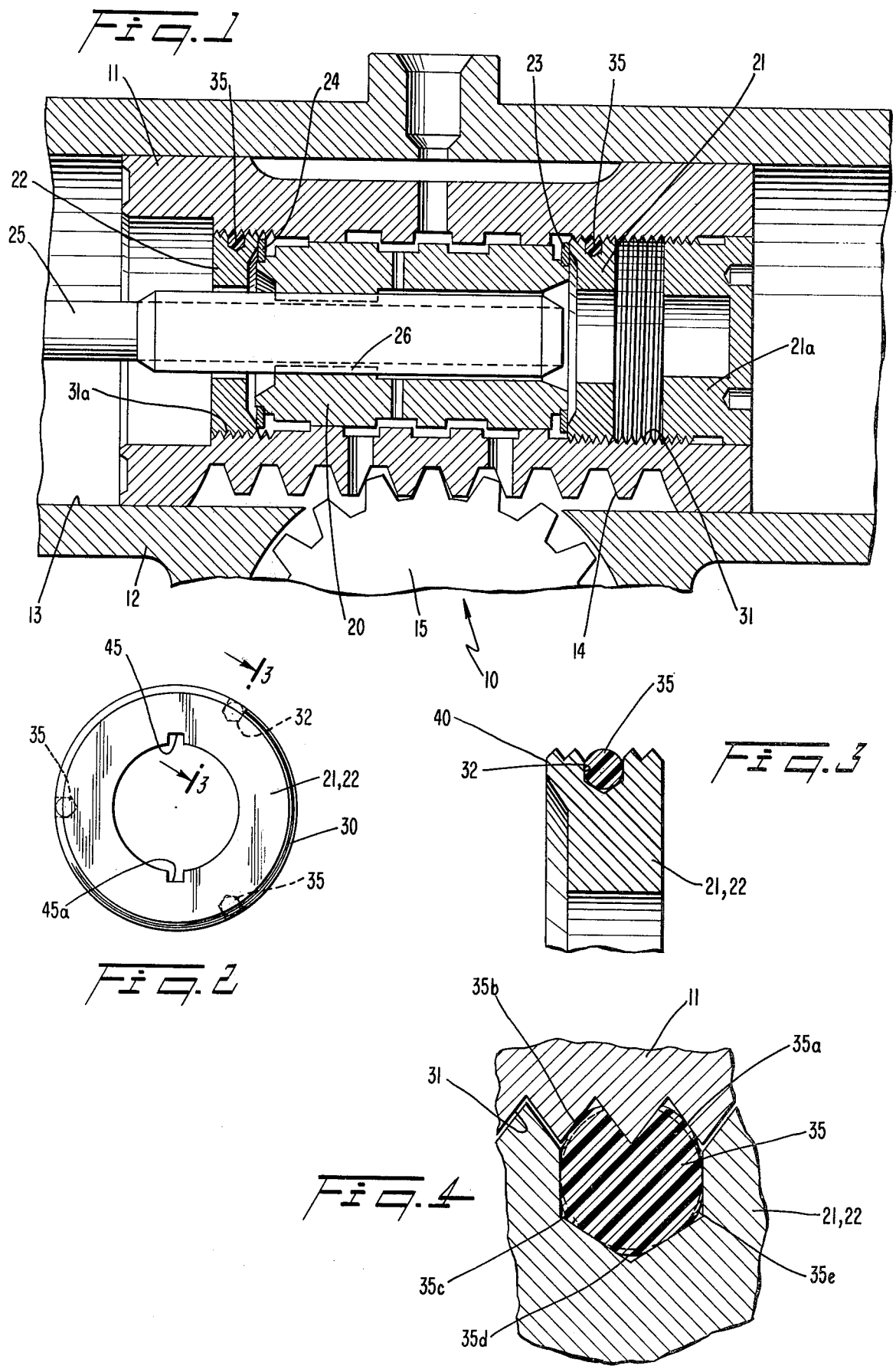

POWER STEERING GEAR WITH INITIAL LOCKABLE SPRING ADJUSTING NUTS

FIELD OF THE INVENTION

The present invention relates to integral power steering gears, and more particularly, to a power steering gear with improved means for locking the adjusting nuts for the valve reversing springs.

BACKGROUND OF THE INVENTION

The design of the basic integral power steering gear has been improved in several ways over the past few years. The original basic design dates back to the R. H. Sheppard U.S. Pat. No. 3,092,083 issued June 4, 1963. This steering gear represents the first successful incorporation of a spool-type valve in the piston with washer springs mounted at opposite ends of the valve to provide the centering action. The springs of the U.S. Pat. No. De 3,092,083 are adjusted to slightly preload the springs against the ends of the valve by adjusting nuts or rings. The adjusting nuts in the original design are then locked in position by the assembly person by drilling a hole through the piston and into the nut and inserting a pin that provides a positive lock against rotation of the nut.

Prior to the present invention, this method of locking the spring adjusting nuts in position has been universally used in the Sheppard integral power steering gear. The method has been successful, but certain aspects of the locking arrangement left something to be desired and actually led to the present invention.

The need that arose and led to the present invention is the need for greater efficiency of the manufacturing process, which includes the initial adjustment of the nuts and initially locking the nuts in position. As described above, in the Sheppard system, a hole is drilled through the piston and into each nut for a final lock after the two nuts are set by the manufacturing technician. This technique of the present invention of providing an initial lock assures that the nuts do not move off the adjusted position as the drilling operation is carefully carried out. Furthermore, it was found previously that while the locking pin locks the nut against rotation, it was still possible to get some radial movement of the nut, especially in the direction directly in line with the locking pin. Thus, a better way of locking the nut not only rotationally, but radially in all directions is identified.

Thus, it is one object of the present invention to provide a spring washer adjusting arrangement for an integral power steering gear wherein the assembly and adjustment of the valve is improved.

It is another and related object of the present invention to provide an initial locking means for the adjusting nuts for the washer springs that do not allow the nut to move during the additional manufacturing step of drilling through the piston into the locking nut and pinning for the final lock.

It is another object of the present invention to provide an arrangement for locking the adjusting nuts in an integral power steering gear wherein the nut is both rotationally, as well as radially locked against movement.

BRIEF DESCRIPTION OF THE INVENTION

Thus, in accordance with the present invention, an integral power steering gear is provided wherein the valve reversing springs within the piston are positioned, adjusted and locked by improved adjusting nuts or threaded rings. The adjusting nuts are provided with threads engaging threaded openings adjacent each end of the piston. As the adjusting nut is turned, the washer spring for the spool-like valve is preloaded and set in accordance with the specification of the steering gear.

This preloading of the springs centers the valve and provides the critical reversibility characteristic to the steering gear. This operation is performed on a test stand using a manometer or similar arrangement.

To provide the initial locking feature of the present invention, radial holes are formed through one of the threads, preferably in the nut itself and a deformable member, preferably a plastic spherical ball is positioned in the aperture. As the nuts are adjusted into position, the deformable plastic member is engaged by the threads and deformed so as to establish sufficient friction to later prevent the inadvertent dislocation of the adjusting nut during the subsequent manufacturing steps.

There are preferably at least three substantially radially extending holes substantially equally space around the nut, i.e., holes drilled into the outer perimeter of the nut at 120° intervals. The plastic spherical balls that fit in the holes extend so as to be approximately flush with the top of the threads. The balls are slightly larger than the holes to provide frictional retention prior to installation of the nut in the piston. Furthermore, the sizing is important to allow the balls to expand upon deformation to engage the sides of the adjacent threads to fully stabilize the nut.

The holes receiving the balls are formed with a substantially tapered inner end and this structure is preferred for allowing greater surface area of the balls to engage the hole and be stabilized itself. The balls are approximately 0.005 inch larger in diameter than the holes. One material for the balls that works well is nylon. Nylon exhibits the desired deformation characteristics and provides for high friction engagement with the thread that bites into the ball.

BRIEF DESCRIPTION OF DRAWINGS

FIG. 1 is a cross-sectional view taken along the longitudinal axis of the power steering gear and showing the new lockable adjusting nut concept;

FIG. 2 is an end view of the adjusting nut of the present invention illustrating the three spaced locking balls;

FIG. 3 is an enlarged sectional view along line 3—3 showing the positioning of the balls in one of the holes of the adjusting nut; and FIG. 4 is still further enlarged cross-sectional view showing the locking ball in the engaged position.

DETAILED DESCRIPTION OF A PREFERRED EMBODIMENT

The nature of the present invention can best be understood by closer reference to the drawings, starting with FIG. 1. A steering gear 10 comprises an operating piston 11 mounted in the main gear housing 12 that forms the cylinder 13. The piston 11 reciprocates in the cylinder 13 to provide the steering output, in accordance with known operation as shown in the prior Sheppard U.S. Pat. No. 3,092,083 mentioned above. The output of the reciprocating piston 11 is translated through a rack 14 to an output pinion 15 (partially shown in FIG. 1). As is well known, the output pinion 15 operates an output shaft (not shown) which in turn is connected to the steering linkage of the vehicle, such as a truck.

A reciprocating spool-type distributing valve 20 is mounted substantially within the center of the piston 11 and almost directly over the output pinion 15. Threaded adjusting nuts or rings 21, 22 at opposite ends of the valve 20 center the valve and preload calibrated washer springs 23, 24. The cylinder head end of the piston 11 is closed by piston end cap 21a.

Input shaft 25 engages the threaded portion of the valve 20 along the threads 26 at the end of the valve closest to the bearing cap end. The valve 20 is stabilized within the piston 11 for reliable and efficient operation.

The adjusting nuts 21, 22 are provided with external threads 30 that mate with the corresponding internal threads 31, 31a formed in the openings in the ends of the piston 11. In accordance with the invention, apertures or holes 32 are formed through the threads 30 and radially down into the body of the nut 21, 22 (see FIGS. 2 and 3). Inside the hole is advantageously positioned a deformable member, namely, a plastic spherical ball 35. The outside exposed or top side of the ball is deformed or cut by at least one of the threads. The ball 35 is sufficiently rigid and has a high coefficient of friction so that this deformation advantageously establishes sufficient friction to prevent inadvertent dislocation or removal of the adjusting nut. The nut 21, 22 as will be seen more fully and detailed below, locks in position both rotationally and radially. The additional separate manufacturing operation, such as drilling through the piston and the nut and pinning the nut can be carried out without the chance that previously existed of the adjustment being disturbed. This allows the valve 20 to be accurately and rapidly centered during the manufacturing process without chance of misadjustment and the need for readjustment as additional manufacturing steps are carried out, as heretofore was not possible.

Preferably, the three deformable balls 35 are nylon so as to be low cost and most effective in providing the required frictional engagement with the mating threads 31, 31a of the piston openings. As shown in FIG. 2, the holes 32 are equally spaced around the nuts 21, 22, that is at approximately 120° intervals. This assures that the nut is held in the center position and not pushed to one side as would result from a single or two balls 35 being provided. This is important since the locking nuts 21, 22 each have a shoulder 40 that provides the seating surface for the outer perimeter of the washer springs 23, 24. This assures an equal force around the full periphery of the nose or end of the valve 20 and is easily provided by this automatic centering action of the nuts. With this aspect of the present invention, there is no likelihood that the nuts 21, 22 because of slight manufacturing tolerance (see FIG. 4) can move out of the desired center position.

In order to give the best working relationship, the plastic balls 35 extend out of the apertures 32 so as to be substantially flush with the top of the threads (see FIG. 3). Furthermore, in order to assist the assembly person, the balls 35 are designed to be slightly larger than the holes 32 so there is frictional retention prior to the installation of the nut in the piston 11. Specifically, the holes 32 are preferably approximately 0.182 inch in diameter; whereas, the balls 35 are fabricated to be approximately 0.005 inch larger.

In addition to being compressed by the differential size just described, it will be realized that as the threads 31, 31a of the openings bite into the plastic ball 35, there is additional bulging of the ball which serves an important purpose. The bulges adjacent the top of the ball, that is bulges 35a, 35b serve to engage the adjacent threads to add substantially to the frictional holding force to prevent rotation of the nut and to provide additional lateral stability necessary to keep the nuts 21, 22 radially positioned in the center. This concept is best shown in FIG. 4 of the drawing.

The bottom or inner end of the holes 32 are formed with a taper. This structure provides three separate areas for additional bulges 35c, 35d and 35e to enter. These bulges further stabilize the ball 35 and assure the locking, as well as the reliable centering properties of the adjusting nuts 21, 22.

As will now be realized, the use of the adjusting nuts 21, 22 for an initial lock is easy to perform and provides a substantial benefit to the manufacturing operation, especially the step of providing the final locking pin. The assembly person for the piston 11 simply places the nuts with the balls 35 installed into the threaded openings. By use of opposed tool notches 45, 45a engaged by a special tool, the nuts are then drawn into the position shown in FIG. 1 so as to slightly compress the washer springs 23, 24. While the piston is monitored by a manometer or similar centering device, the nuts 21, 22 are given a final adjustment. The adjustment provides the desired preload, if any, on the washer springs 23, 24. Once the final position is reached, the further pinning operation for the final lock is performed. Advantageously, the nuts 21, 22 are frictionally held against rotation and are radially positioned so that there can be no loss of the adjustment during this step.

In summary, the present invention provides an improvement in the initial locking and radial location of the nuts 21, 22 for adjusting the washer springs 23, 24 and positioning the valve 20 within the piston 11. The three spaced nylon balls 35 on each nut 21, 22 are easly installed and provide especially easy adjustment during assembly of the valve 20 within the piston 11. The nylon balls are sufficiently rigid and have a sufficiently high coefficient of friction so that when deformed the desired results are obtained.

I claim:

1. An integral power steering gear having a reciprocating power piston in a cylinder, a valve within the piston to selectively distribute pressurized fluid to a first and second end of the piston within the cylinder for steering action, a washer spring adjacent each end of said piston to provide centering action for the valve, a steering input shaft operatively engaging the valve, output means in engagement with said piston, the improvement comprising an adjusting nut having threads mounted adjacent each end of said valve in the piston for adjusting the loading in the washer springs, openings in said piston having mating threads for operatively receiving the adjusting nuts, aperture means provided in one of said threads and a deformable insert means placed in said aperture means, the deformable insert means being deformed upon engagement with the other threads, centering said nut and establishing sufficient friction to prevent inadvertent movement of said adjusting nut during subsequent manufacturing steps of preloading of the springs and final locking of the adjusting nut in position.

2. The power steering gear of claim 1 wherein said aperture means includes at least three substantially radially extending holes substantially equally spaced apart around said piston to further centrally position said nut to assure proper, centered engagement with said washer spring.

3. The power steering gear of claim 2 wherein said deformable insert means comprise plastic balls having substantially high coefficient of friction characteristics and extending so as to be substantially flush with the top of said threads.

4. The power steering gear of claim 3 wherein said balls are slightly larger than said holes to provide frictional retention prior to installation of said nut in said opening.

5. The power steering gear of claim 2 wherein holes are formed in said adjusting nut and extend to a substantially tapered inner end to receive said deformable insert means.

6. The power steering gear of claim 5 wherein said deformable insert means are plastic spherical balls extending so as to be substantially flush with the top of said threads.

7. The power steering gear of claim 6 wherein said plastic spherical balls are sufficiently larger than said holes to bulge upon deformation to engage the sides of adjacent threads to stabilize the nut in said opening and extend down into said tapered inner end to stabilize the balls themselves.

8. The power steering gear of claim 7 wherein said holes are approximately 0.182 inch diameter and said balls are approximately 0.005 inch larger.

9. The power steering gear of claim 2 wherein said deformable insert means comprise plastic spherical balls, said balls being nylon and sufficiently rigid and having sufficient coefficient of friction to prevent radial and rotational movement of said nut when deformed.

10. The power steering gear of claim 9 wherein said balls are sufficiently larger than said holes to bulge upon deformation to engage the sides of adjacent threads to stabilize the nut in said opening.

11. The power steering gear of claim 10 wherein said nut has a peripheral shoulder on one face thereof for engagement with said washer spring to load the same.

* * * * *